J. F. TINLEY.
PORTABLE WATER FILTER.
APPLICATION FILED SEPT. 28, 1916.

1,222,162.

Patented Apr. 10, 1917.

Inventor:—
James F. Tinley
by attorneys

UNITED STATES PATENT OFFICE.

JAMES F. TINLEY, OF BROOKLYN, NEW YORK.

PORTABLE WATER-FILTER.

1,222,162.   Specification of Letters Patent.   Patented Apr. 10, 1917.

Application filed September 28, 1916. Serial No. 122,654.

*To all whom it may concern:*

Be it known that I, JAMES F. TINLEY, a citizen of the United States, and resident of the borough of Brooklyn, in the city and State of New York, have invented a new and useful Improvement in Portable Water-Filters, of which the following is a specification.

This invention relates to an improvement in portable water filters, with the object in view of providing a device which may be lowered into the water to any desired depth and there automatically filter and fill the container with water of a considerably lower temperature than if taken from the surface of the water.

Another object is to provide a device, the parts of which may be readily separated for cleaning or other purposes.

Figure 1:
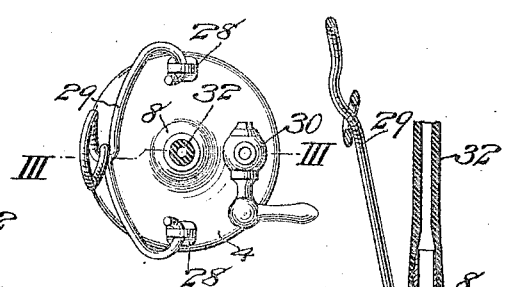
Figure 2:
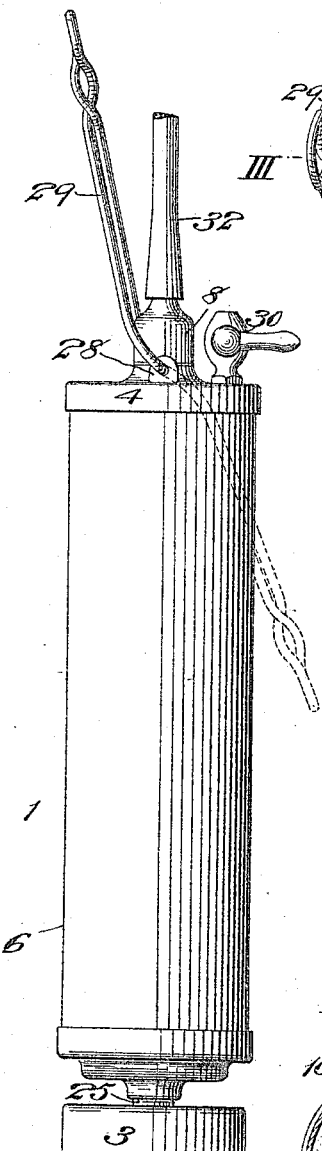
Figure 3:
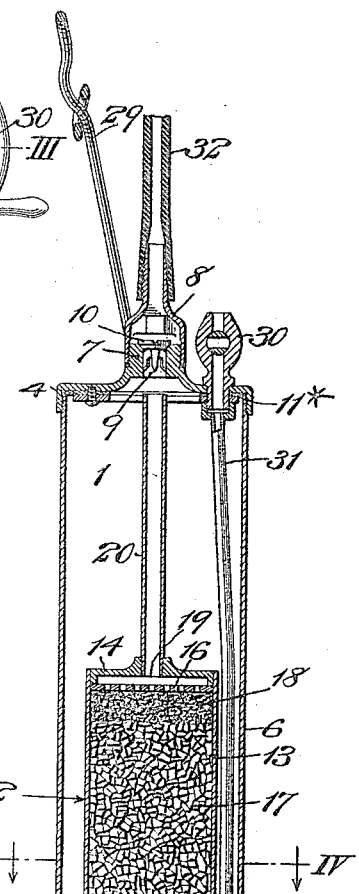
Figure 4:
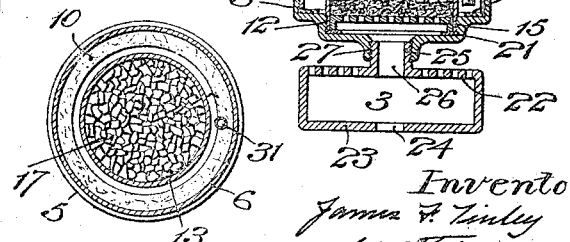

A practical embodiment of my invention is represented in the accompanying drawings, in which, Figure 1 represents a plan view of my improved device, Fig. 2 is a side elevation of the same, Fig. 3 is a longitudinal central section taken in the plane of the line III—III of Fig. 1, and Fig. 4 is a horizontal section taken in the plane of the line IV—IV, of Fig. 3.

The device consists of a reservoir 1, a filtering chamber 2, and a strainer chamber 3.

The reservoir is provided with an upper head 4, a lower head 5 and a tubular portion 6 connecting the heads. The upper head is formed with a teat 7 which is screw-threaded to receive a nozzle 8. A passage 9 through the teat 7, forms an outlet for the reservoir. A check valve 10 is seated in the passage 9, to control the outlet of the air when the filter is submerged. The tubular portion 6 has a screw-thread engagement with the upper and lower heads, the joints of which are made water-tight by means of gaskets 11, 11*, interposed between the heads and portion 6.

The lower head 5 is provided with a screw-threaded recess 12, within which the screw-threaded lower end of the filtering chamber 2 is secured in position to extend upward into the reservoir 1.

The filtering chamber comprises a tubular member 13 having a fixed top 14 and a removable perforated bottom 15. A perforated plate 16 is located adjacent to the top 14, between which plate and the perforated bottom 15, filtering material, such as charcoal 17 and absorbent cotton 18 is placed. The top 14 has a outlet 19 within which a pipe 20 is fixed to extend upwardly in the reservoir, the upper end of which pipe being in close proximity to the check valve 10. The recess 12 is provided with a gasket 21 which seals the joint between the lower head and the tubular member 13. The strainer chamber 3 is provided with an upper wall 22 which is perforated, and a lower wall 23 which has a drain hole 24. The upper wall is also provided with a screw-threaded nipple 25 having a passage 26 therethrough, which nipple is screwed into a threaded hole 27 in the lower head 5. This strainer chamber 3 forms a convenient base upon which the filter may stand.

For convenience either in carrying or lowering the filter into the water, I provide the upper head 4 with ears 28 and a handle 29 secured therein, which handle is adapted to swing to the position shown in dotted outline in Fig. 2.

A manually controlled air valve 30 is fixed to the upper head, and from which valve a pipe 31 is extended downwardly into the reservoir between the filtering chamber 13 and the tubular member 6, to a point in close proximity to the lower head 5, the purpose of which will be hereinafter explained.

In operation, the filter is submerged to the desired depth and the water will thereupon enter the strainer chamber 3 through the perforated upper wall 22, pass upwardly through the passage 26, lower head 5, bottom 15, absorbent cotton 18, charcoal 17, perforated plate 16, and pipe 20, where it will flow over the pipe into the reservoir. The check valve 10 is for the purpose of preventing unfiltered water entering the filter chamber by way of the passage 9.

Water entering the filter at any depth will not have sufficient power to compress the air within the filter above the surrounding pressure at the point where the filter is submerged. To allow for escape of air from the filtering chamber as the filter is being filled at slight depths, say less than five or six feet, a small hose 32 may be attached to the nozzle 8, said hose being of sufficient length to have its upper end above the surface of the water in which the filter is submerged. For filling the filter from considerable depths, say beyond five or six feet, the hose may be dispensed with. The surrounding pressure at depths greater than five or six feet for instance, will have power enough to compress the air in the filter as the water enters, to a pressure equal to the pressure of the water at that depth, and when the air and the water pressure become equal, no more water will enter the filter. The filter may then be raised to or near the surface of the water and the excess of air will flow out through the valve 10 and nozzle 8, to atmospheric pressure. The filter may then be returned to the desired depth and the operation repeated until the filter is filled. This arrangement prevents the rapid filling of the filter, the gradual filling of the filter insuring a complete filtration of the water entering the same. A rope or other suitable connection, not shown, may be fastened to the handle 29, for permitting the filter to be lowered to the desired depth.

The reservoir may be emptied in bottle fashion through the nozzle (after the tubing has been removed), by opening the air valve 30 which admits air to the inside of the reservoir through the pipe 31, the check valve 10 falling to one side as the filter is tilted.

While I have described the device as being a portable filter, which may be lowered into water and thereby filled, it will be understood that by the removal of the strainer chamber 3, the reservoir 1 with its filtering chamber 2, may be attached to an ordinary faucet and so provide a continuous stream of filtered water.

It is obvious that various changes may be made in the form, construction and arrangement of the several parts without departing from the spirit and scope of my invention, and hence I do not intend to be limited to the specific details set forth except as they may be included in the claims.

What I claim is:

1. A portable filter comprising a reservoir having an outlet and a manually controlled air inlet, a filtering chamber within said reservoir, and a strainer chamber forming a base communicating with said filtering chamber.

2. A portable filter comprising a reservoir having an outlet and a manually controlled air inlet, a check valve in said outlet, a filtering chamber within said reservoir, and a strainer chamber forming a base communicating with said filtering chamber.

3. A portable filter comprising a reservoir having an outlet and a manually controlled air inlet, a check valve in said outlet, a filtering chamber provided with an outlet near the top of said reservoir and in close proximity to said check valve, and a strainer chamber forming a base communicating with said filtering chamber.

4. A portable filter comprising a reservoir having an outlet and a manually controlled air inlet, a check valve in said outlet, a filtering chamber provided with an outlet near the top of said reservoir and in close proximity to said check valve, and a strainer chamber forming a base communicating with said filtering chamber, said strainer chamber having a perforated top and a drain hole in its bottom.

5. A portable filter comprising a reservoir having removable upper and lower heads, an outlet and a manually controlled air inlet in said upper head having a pipe extended downwardly within the reservoir to a point in close proximity to the lower head, and a filtering chamber secured in said lower head and extending upwardly in said reservoir, said lower head having an opening communicating with said filtering chamber.

6. A portable filter comprising a reservoir having removable upper and lower heads, an outlet and a manually controlled air inlet in said upper head having a pipe extended downwardly within the reservoir to a point in close proximity to the lower head, a filtering chamber secured in said lower head and extending upwardly in said reservoir, said lower head having an opening communicating with said filtering chamber, and a strainer chamber secured to the opening in said lower head.

7. A portable filter comprising a reservoir having removable upper and lower heads, an outlet and a manually controlled air inlet in said upper head having a pipe extended downwardly within the reservoir to a point in close proximity to the lower head, and a filtering chamber secured in said lower head and extending upwardly in said reservoir, said lower head having an opening communicating with said filtering chamber, and a strainer chamber secured to the opening in said lower head, and a handle hinged on the upper head for carrying the filter.

In testimony, that I claim the foregoing as my invention, I have signed my name this 15th day of September, 1916.

JAMES F. TINLEY.

Copies of this patent may be obtained for five cents each, by addressing the "Commissioner of Patents Washington, D. C."